United States Patent [19]

Raghunathan

[11] 4,308,581
[45] Dec. 29, 1981

[54] SINGLE STEP SYSTEM FOR A MICROCOMPUTER

[75] Inventor: Kuppuswamy Raghunathan, Austin, Tex.

[73] Assignee: Motorola Inc., Schaumburg, Ill.

[21] Appl. No.: 79,766

[22] Filed: Sep. 28, 1979

[51] Int. Cl.³ .............................................. G06F 11/00
[52] U.S. Cl. ..................... 364/200; 371/19; 371/29
[58] Field of Search ...................... 364/200 MS File; 371/17, 19, 29

[56] References Cited

U.S. PATENT DOCUMENTS 3,415,981  12/1968  Smith et al. .................. 364/200 X
3,937,938   2/1976  Matthews ........................... 371/19
3,987,420  10/1976  Badagnani ...................... 371/29 X
4,091,447   5/1978  Dillon et al. ....................... 364/200

Primary Examiner—Raulfe B. Zache
Attorney, Agent, or Firm—Joe E. Barbee

[57] ABSTRACT

A microcomputer system having a single step capability for use for debugging a program is provided. The microcomputer has a microprocessor which provides a load instruction signal. The load instruction signal is used to couple a software interrupt op code into the microprocessor. During the software interrupt routine, contents of registers indicating the state of the microprocessor are transferred to a stack. As the contents are being transferred they will be available on the microprocessor output bus for capture and observation. Upon completion of the software interrupt routine a return from single step instruction causes the contents of the stack to be placed back in their original registers and the program counter of the microprocessor is decremented by one so that the microprocessor can pick up the program from the point where it was interrupted.

11 Claims, 2 Drawing Figures

SINGLE STEP SYSTEM FOR A MICROCOMPUTER

This invention relates, in general, to data processing systems, and more particularly, to a microcomputer having a single step system useful in debugging programs.

During the development of a digital data processing system the ability to step through a microcomputer based program is a virtual necessity during its debugging test phases, particularly, for the builder of a small number of digital data processors. For the builder of a great number of digital data processor systems the EXORciser (a trademark of Motorola, Inc.) system is available. The EXORciser system is a development tool used in the design and development of M6800 microcomputer systems. For the builder of one or two digital data processing systems, expense of the EXORciser system may not be justified. Also available in the past has been a less sophisticated system which requires keyboard inputs to get into the single step routine and additional keyboard inputs to single step the processor registers. It would be highly desirable to have a simplified system requiring a minimum amount of keyboard manipulation.

Accordingly, it is an object of the present invention to provide a single step debug system requiring a reduced amount of components.

SUMMARY OF THE INVENTION

In carrying out the above and other objects, of the present invention, there is provided a single step system for debugging a microcomputer based program. The microcomputer has a microprocessor which provides a load instruction signal and has memory area which can be used as a stack to stack the contents of certain of the registers during the single step procedure. The load instruction signal indicates a fetch of an op code is in progress and is used by the single step system to couple a software interrupt op code into the microprocessor. During the software interrupt routine the contents of preselected registers in the microprocessor are stored in the stack, and as the contents are being transferred to the stack they will be available on the microprocessor output bus for capture and observation. After the software interrupt routine, execution of a unique instruction will transfer back the contents from the stack to the respective registers and allows the microprocessor to execute the next instruction which was preempted by the software interrupt routine.

The subject matter which is regarded as the invention is set out in the claims. The invention itself, however, together with further objects and advantages thereof, may be better understood by referring to the following description taken in conjunction with the accompanying drawings.

DETAILED DESCRIPTION OF THE DRAWINGS

Figure 1:
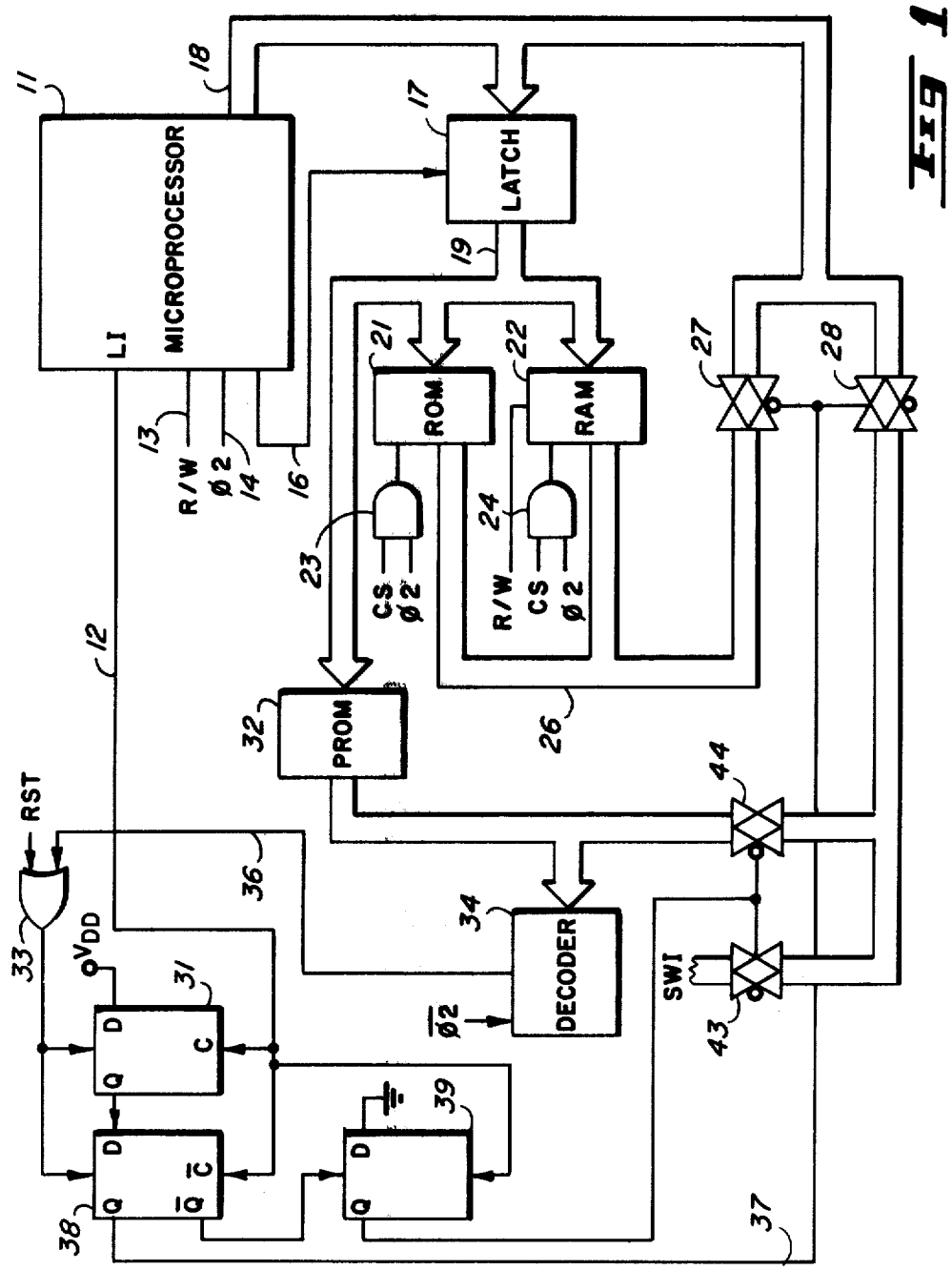
FIG. 1 illustrates an embodiment of the present invention.

FIG. 1 illustrates, in block diagram form, a microprocessor 11 having a plurality of registers and a self contained random access memory (RAM) which can be used as a stack. Microprocessor 11 also provides an output signal on line 12 indicating that an instruction is being loaded into the microprocessor. Microprocessor 11 provides a read/write signal on line 13, line 14 carries a clock signal $\phi 2$, and line 16 carries an address strobe signal to latch 17. The read/write signal indicates to a peripheral whether it is going to read or write data on the next machine cycle. The address strobe is used to indicate the presence of an address on multiplexed bus 18. In a preferred embodiment microprocessor 11 has a multiplexed bus 18 which carries data to microprocessor 11 and addresses from microprocessor 11 to latch 17. Latch 17 is strobed by the address strobe signal carried by line 16 and latches the address going to read only memory (ROM) 21 and to random access memory (RAM) 22. The output of latch 17 also goes to a programmable read only memory (PROM) 32. Data out of ROM 21 and RAM 22 are coupled by bus 26 to a controllable switch 27, illustrated as a transmission gate, which goes to the multiplexed bus input of microprocessor 11 via bus 18.

Load instruction signal LI is coupled by line 12 to flip-flops 31, 38 and 39. The load instruction signal indicates a fetch of the next op-code is in progress. The occurrence of the trailing edge of the load instruction indicates completion of the loading of the op-code. Flip-flops 31, 38, and 39 are D type flip-flops interconnected so that the outputs of flip-flops 31 and 39 will change on the trailing edge of signal LI, and the output of flip-flop 38 will change on the leading edge of signal LI. Line 12 is connected to the clock, C, inputs of flip-flops 31 and 39 and to the clock, C, input of flip-flop 38. Flip-flop 31 has its D input connected to a voltage terminal $V_{DD}$ and its Q output connected to the D input of flip-flop 38. Flip-flop 38 has its Q output connected to transmission gates 27 and 28, and its Q output connected to the set input of flip-flop 39. Flip-flop 39 has its D input connected to a voltage reference, illustrated as ground, and its Q output connected to transmission gates 43 and 44. Flip-flops 31 and 38 have their reset inputs connected to the output of OR gate 33. A reset signal, RST, is connected to one of the inputs of OR gate 33, and the other input of gate 33 is connected to the output of decoder 34.

A basic microcomputer system would have microprocessor 11, latch 17, ROM 21, RAM 22, AND gate 23, and AND gate 24. Bus 26 would be directly coupled to bus 18. The additional elements illustrated provide the single step capability to the microcomputer. One suitable microprocessor is disclosed in copending application Ser. No. 065,294 assigned to the same assignee as the present application and hereby incorporated herein by reference.

An AND gate 23 is coupled to ROM 21 to enable ROM 21 when it is being addressed. AND gate 23 receives a chip select signal CS and a clock signal $\phi 2$ at its inputs. An AND gate 24 is coupled to RAM 22 to enable the RAM when it is being addressed. AND gate 24 has a chip select input CS and a clock signal $\phi 2$ input.

The output of PROM 32 is coupled to switch 28 by switch or transmission gate 44. Switch 28 then couples the output to bus 18. Also coupled to switch 28 by switch 43 is software interrupt, SWI, which is an op code for an interrupt generated by software. PROM 32 contains the single step routine, and can be any convenient type of memory, but in a preferred embodiment is an electrically programmable read only memory.

The operation of the single step feature will now be explained. Reset signal RST serves to reset flip-flops 31 and 38 which makes the Q output of flip-flop 38 a logic zero level causing switch 27 to be enabled thereby coupling bus 26 to bus 18. Since flip-flop 38 is reset, its Q output will be a logic level one thereby causing flip-flop 39 to be set. When switch 27 is enabled, switch 28 is disabled. By the Q output of flip-flop 39 being a logic one level, switch 43 will be enabled thereby coupling the software interrupt instruction, SWI, to switch 28. When switch 43 is enabled, switch 44 is not enabled. When the first load instruction signal, LI, appears signifying loading of the first instruction, the Q output of flip-flop 31 will change to a logic one level on the trailing edge of LI.

Processor 11 executes the first instruction in a normal manner. At this point in time, the Q output of flip-flop 31 is a logic one level, the Q output of flip-flop 38 is a logic zero level, and the Q output of flip-flop 39 is a logic one level. After the first instruction is executed, LI appears and the leading edge of this LI changes the Q output of flip-flop 38 to a logic one level thereby enabling switch 28 and disabling or opening switch 27. Since switch 43 was already enabled, the software interrupt instruction, SWI, will be coupled by switch 28 to bus 18. Processor 11 receives SWI and proceeds to execute it. At the trailing or falling edge of LI the Q output of flip-flop 39 becomes a logic zero level (i.e. as soon as SWI is loaded into processor 11), and switch 43 is thereby disabled and switch 44 is enabled coupling data from PROM 32 via switch 28 to bus 18.

At the end of SWI, microprocessor 11 executes the user's single step routine which was stored in PROM 32. This is achieved by starting the user's routine at the SWI routine starting address. The user's routine may typically be examining the stack contained in processor 11 and other desired machine states. The last instruction of the user's routine will have to be the return from single step, RSS, instruction. In addition to processor 11 receiving RSS, decoder 34 also receives RSS and decodes it. Decoder 34 is coupled to the output of PROM 32 and its only purpose is to decode RSS. Decoder 34 also has an enabling input φ2. One clock cycle after RSS appears, decoder 34 decodes RSS and generates an output which is coupled to an input of OR gate 33 causing OR gate 33 to reset flip-flops 31 and 38. As RSS is being executed, flip-flops 31, 38 and 39 are prepared so that switches 27 and 28 are in the proper state to resume executing an instruction from bus 26. It should be noted that the return from single step, RSS, instruction returns data from the stack to the registers in processor 11 and decrements the program counter in processor 11.

Software interrupt causes preselected registers of microprocessor 11 to be stored in the stack. PROM 32 can contain instructions to have the contents in the stack from each one of the registers loaded in sequence to an accumulator. The contents of the accumulator is then shown on a display. The display may be of any suitable form such as a CRT tube, LED readouts, or a printout. When the contents of all the registers has been displayed the last instruction contained in PROM 32 will be return from single step instruction, RSS, which causes the contents of the stack to be placed back into the respective registers and causes a program counter to be decremented by one so that it can then execute the instruction which was preempted by the software interrupt from PROM 32.

Figure 2:
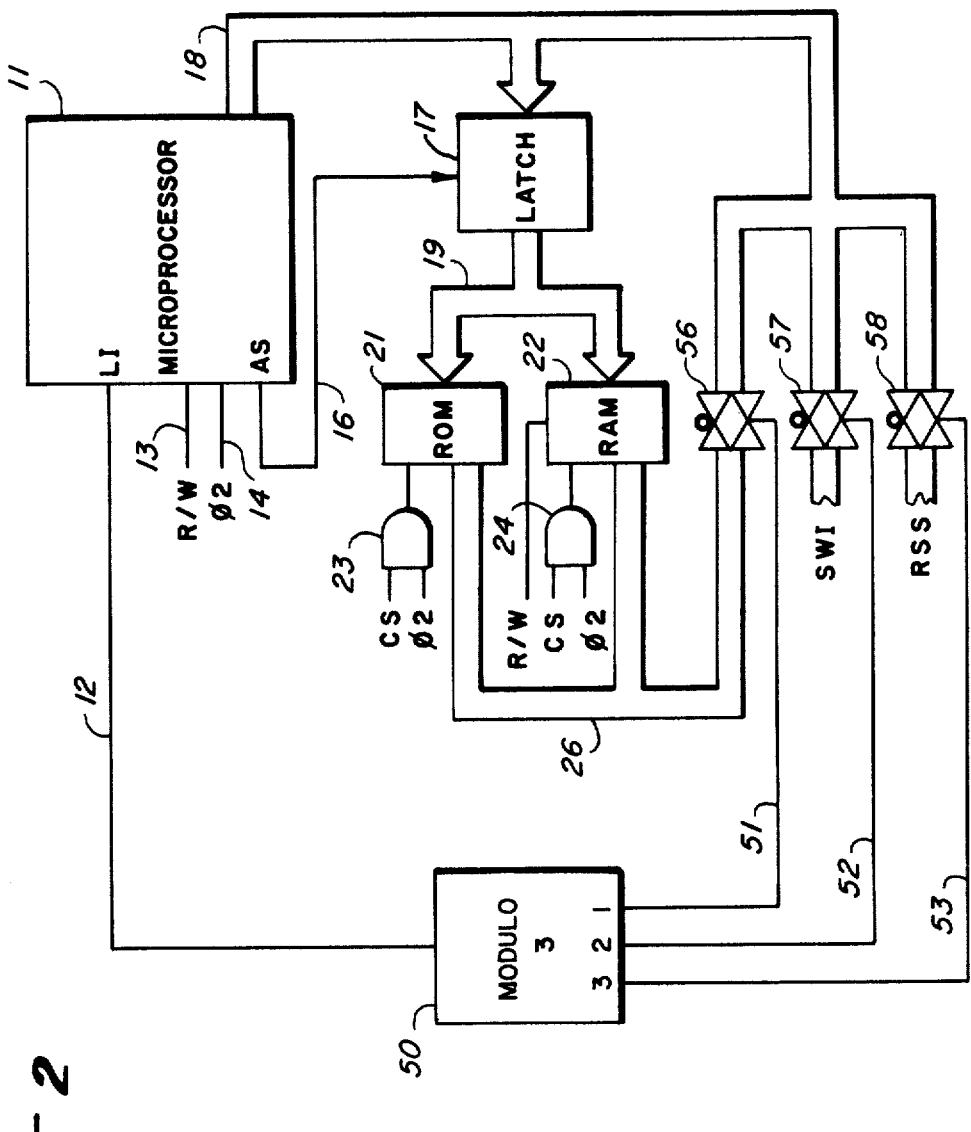
FIG. 2 illustrates another embodiment of the present invention.

FIG. 2 illustrates a fundamental embodiment of the present invention in one form thereof. The elements of FIG. 2 which carry the same reference numerals as the elements of FIG. 1 perform a similar function as in FIG. 1. A modulo 3 counter 50 is coupled to microprocessor 11 by line 12. Line 12 carries the load instruction signal, LI. Each load instruction signal serves to update the count in modulo 3 counter 50. Upon the first load instruction input signal to modulo counter 50 an output is produced on line 51. A second input to modulo counter 50 provides a count 2 output on line 52 and a third input to counter 50 provides a count 3 output on line 53. Line 51 is connected to transmission gate 56 and serves to enable transmission gate 56. Line 52 is coupled to transmission gate 57 and serves to enable transmission gate 57 while line 53 is coupled to transmission gate 58 and serves to enable transmission gate 58. Transmission gate 56 couples bus 26 to bus 18, transmission gate 57 couples a software interrupt op code, SWI, to bus 18, and transmission gate 58 couples a return from single step instruction op code, RSS, to bus 18.

As the first load instruction signal, LI, is received by counter 50 the counter will update and provide a count 1 output on line 51. The count 1 output on line 51 will enable transmission gate 56 which couples ROM 21 and RAM 22 to multiplex bus 18 thereby allowing microprocessor 11 to execute a normal program. At the occurrence of the load instruction signal appearing on line 12 counter 50 will update to a count of 2 which is provided as an output on line 52 and at the same time will remove the count 1 output on line 51. The count 2 output on line 52 will enable transmission gate 57 thereby coupling a software interrupt op code to microprocessor 11 via multiplex bus 18. As mentioned hereinbefore, the software interrupt routine will cause preselected registers, which indicate the state of the microprocessor, to be stored in a stack. As the contents from the preselected registers are stored, the contents will be present on multiplex bus 18 thereby being accessible for display on any apppropriate media. On some microprocessors it may be found desirable to slow down the operation of the microprocessor in order to properly observe the data being displayed.

At the end of the software interrupt routine another load instruction signal will be generated on line 12 thereby increasing counter 50 to provide a count 3 output on line 53 and remove the count 2 output on line 52. The count 3 output on line 53 will enable transmission gate 58 thereby coupling a return from single step, RSS, instruction to microprocessor 11 via multiplex bus 18. As explained hereinbefore, the return from single step instruction will return all the stacked data to the respective registers and allow microprocessor 11 to continue with the next instruction which was preempted by the software interrupt routine. At the completion of the return from single step instruction another load instruction signal will be generated on line 12 thereby updating counter 50 to provide a count 1 output on line 51. This causes the sequence to repeat itself since count 1 output on line 51 will enable transmission gate 56 thereby coupling the next instruction on bus 26 to multiplex bus 18.

If it is desired to operate microprocessor 11 in a normal configuration, without using the single step routine, line 12 can be opened, by an appropriate switch, and counter 50 set to a count of 1. Since 12 will be open then counter 50 will not be updated and transmission gate 56 will remain enabled.

By now it should be appreciated that there has been provided a single step system having a reduced component count and useful in debugging a program.

I claim:

1. A single step system for checking a program in a microcomputer, the microcomputer having a first memory, a processor, and display means, and providing as outputs at least a load instruction signal indicating an instruction has been loaded into the microcomputer, comprising: a latch means coupled to the microcomputer for receiving the load instruction signal, the latch means producing an output signal on the trailing edge of the load instruction signal; switching means coupled to the output signal from the latch means so that the output signal can control the switching means; and second memory means for storing a single step program, the switching means being capable of switching data from the first memory or the second memory means to the processor.

2. The single step system of claim 1 further including a decoder coupled to the second memory means for decoding a last instruction of the single step program, the decoder providing an output to reset the latch means.

3. The single step system of claim 1 wherein the latch means is at least one flip-flop.

4. The single step system of claim 3 wherein the second memory means is a programmable read only memory.

5. The single step of claim 4 wherein the switching means comprises a pair of transmission gate means for enabling one of the pair while disabling the other of the pair.

6. A method of debugging a program in a microcomputer having memory storage means, storage location for a single step routine, visual display means, a processor and providing a load instruction signal indicating an instruction has been loaded into the processor, comprising: switching data from the storage location to the processor in place of having data flow from the memory storage means to the processor, the switching data taking place upon occurrence of trailing edge of the load instruction; storing contents from preselected registers of the processor into a stack; displaying contents of the preselected registers from the stack to the visual display means; reloading the contents from the stack to the preselected registers; and decrementing the program counter by one so that the processor can continue with the next instruction in sequence.

7. A microcomputer system having capability of debugging a program and having a memory for storing programs, display means, and a processor providing a load instruction signal, comprising: a latch means coupled to the processor to receive the load instruction signal, the latch means providing an output which is set to a predetermined state by the trailing edge of the load instruction signal; controllable means coupled to the latch means and being responsive to the output from the latch means, the controllable means routing a software interrupt routine to the processor instead of the regular programming; and a decoder to provide an output when the last instruction of the software interrupt routine is executed, the output of the decoder being coupled to the latch means to reset the latch means.

8. A system useful in combination with a microcomputer for debugging a program, the microcomputer having a memory, a display means, and a processor providing a load instruction signal and having an input bus, comprising: a latch means coupled to the instruction load signal and being triggered by the load instruction signal; a programmable read only memory having an output bus; a switching means coupled to the latch means so that the latch means can control the switching means, the switching means switching the input bus from the memory to the programmable read only memory; and decoding means coupled to the output bus and providing an output coupled to the latch means to reset the latch means upon occurrence of the last instruction stored in the programmable read only memory.

9. A system useful for debugging a microprocessor program wherein the microprocessor provides a load instruction signal and has an output bus, the system also having display means and comprising: means for responding to the load instruction and providing an output in response thereto; first switching means coupled to the output bus and being controlled by the output of the means for responding, the first switching means providing a software interrupt op code to the output bus when enabled by the output of the means for responding; and second switching means coupled to the output bus for providing a return from single step op code to the microprocessor when enabled by the output from the means for responding.

10. The system of claim 9 wherein the means for responding is a counter which counts in response to the load instruction signal.

11. The system of claim 9 wherein the means for responding is a first, a second, and a third flip-flop which are clocked in response to the load instruction signal, the first flip-flop providing an output to the second flip-flop, and the second flip-flop providing an output to the third flip-flop.

* * * * *